(12) United States Patent
Kramer et al.

(10) Patent No.: US 9,910,902 B1
(45) Date of Patent: Mar. 6, 2018

(54) ANONYMIZING USER IDENTIFIABLE INFORMATION

(71) Applicant: Facebook, Inc., Menlo Park, CA (US)

(72) Inventors: Adam Kramer, San Francisco, CA (US); Thomas Lento, Menlo Park, CA (US); Rajat Goel, Sunnyvale, CA (US); Raghotham Sathyanarayana Murthy, San Francisco, CA (US); Nileema Bharat Shingte, Sunnyvale, CA (US); Karthik Ranganathan, Fremont, CA (US); Ankit Agarwal, Sunnyvale, CA (US); Sameer Menon, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 831 days.

(21) Appl. No.: 13/774,828

(22) Filed: Feb. 22, 2013

(51) Int. Cl.
    *G06F 17/30* (2006.01)

(52) U.S. Cl.
    CPC ... *G06F 17/30563* (2013.01); *G06Q 2220/10* (2013.01)

(58) Field of Classification Search
    CPC .............................. G06F 17/30563
    USPC .......................................... 705/50
    See application file for complete search history.

(56) References Cited

U.S. PATENT DOCUMENTS

| | | | | | |
|---|---|---|---|---|---|
| 3,688,090 | A | * | 8/1972 | Rankin | G06G 1/0005 235/70 R |
| 5,961,593 | A | * | 10/1999 | Gabber | G01M 13/021 370/329 |
| 7,739,139 | B2 | * | 6/2010 | Robertson | G06Q 10/02 705/7.12 |
| 9,749,132 | B1 | * | 8/2017 | Hamilton | G06F 21/10 |
| 2008/0118150 | A1 | * | 5/2008 | Balakrishnan, Sr. | G06F 17/2276 382/176 |
| 2010/0082652 | A1 | * | 4/2010 | Jones | G06Q 30/02 707/758 |
| 2010/0185656 | A1 | * | 7/2010 | Pollard | G06F 21/6245 707/769 |

* cited by examiner

*Primary Examiner* — James D Nigh
(74) *Attorney, Agent, or Firm* — Perkins Coie LLP

(57) ABSTRACT

The disclosed techniques provide systems and methods for anonymizing various portions of information, action logs, end-user information, and/or other data sets that are stored in non-indexed storage systems. More specifically, various anonymization procedures are described for redacting UII and/or replacing UII in raw data with randomly generated information (RGI). The anonymization process is performed on a rolling basis as raw data is received. An anonymization mapping table maps (or associates) the replaced UII in the anonymized data to the RGI, and eventually all raw data can be deleted.

17 Claims, 14 Drawing Sheets

| UID | NAME | EMAIL ADDRESS | IP ADDRESS | BROWSER | URL | OTHER |
|---|---|---|---|---|---|---|
| UID_1 | NAME_1 | USER1@FB.COM | IP ADDRESS #1 | BROWSER_1 | URL_1 | OTHER_1 |
| UID_2 | NAME_2 | USER2@FB.COM | IP ADDRESS #2 | BROWSER_2 | URL_2 | OTHER_2 |
| UID_3 | NAME_3 | USER3@FB.COM | IP ADDRESS #3 | BROWSER_3 | URL_3 | OTHER_3 |
| UID_4 | NAME_4 | USER4@FB.COM | IP ADDRESS #4 | BROWSER_4 | URL_4 | OTHER_4 |
| UID_5 | NAME_5 | USER4@FB.COM | IP ADDRESS #5 | BROWSER_5 | URL_5 | OTHER_5 |

*FIG. 9*

ANONYMIZING USER IDENTIFIABLE INFORMATION

FIELD OF THE INVENTION

The present invention generally relates to information privacy. More specifically, various embodiments of the present invention relate to systems and methods for anonymizing user identifiable information (UII).

BACKGROUND

Companies can store a tremendous amount of end-user data. For example, end-user data can include, but is not limited to, address information, credit card information, photographs, e-mails, healthcare records, financial records, electronic documents, messages, associations with other end-users, and other types of information. Not only do the end-users have an expectation of privacy, but in many cases there can be legal requirements on the dissemination and use of the data. As a result, unauthorized access and/or use of the end-user's data can result in dissatisfied customers and potential legal liability.

Furthermore, when an end-user requests to delete an account, a company may be under ethical and/or legal obligations to expeditiously remove information associated with the deleted accounts. For example, in most cases, at least some of the information associated with the deleted account contains user identifiable information (UII). The term "user identifiable information" or "UII" includes any information that can be directly identified or linked to a specific individual or end-user, with or without his or her knowledge. Additionally, it is often the case that the UII related to a deleted account must be scrubbed or otherwise deleted from a company's storage systems within a specified time frame.

Traditionally, companies that store vast amounts of end-user data have both front-end systems and back-end systems (e.g., data warehouse(s)) for data storage purposes. However, because of the nature and volume of data stored in a back-end systems, at least some of the data in the back-end system may not be indexed (i.e., index lookups are not available). One such example of a system is Hive. Hive is a data warehouse system for Hadoop Distributed File System (HDFS) that facilitates easy data summarization, ad-hoc queries, and the analysis of large datasets stored in Hadoop compatible file systems.

Unfortunately, data in Hadoop is stored as files rather than as a database structure and thus, specific portions of information cannot be looked up via index lookups without reading the entire file. That is, an indexing issue exists in some storage systems in which some or all of the data, such as user log information, is not indexed. Consequently, to remove UII from the user log information, a system must scan each file in the data warehouse for UII and subsequently rewrite the entire file. This infrastructure becomes particularly troublesome when a company attempts to comply with a user's request to delete his/her account. This is because the system has to scan each file in the data warehouse for UII and subsequently rewrite the entire file each day that any user in the system deletes an account—essentially every day for a social networking company.

Companies may want to comply with a user's request to delete his/her account and remove UII. However, scanning and rewriting each file in a data warehouse is an arduous process that is both time consuming and processor intensive. Furthermore, if a company has petabytes of user data, this process can quickly become unmanageable.

Overall, the examples herein of some prior or related systems and their associated limitations are intended to be illustrative and not exclusive. Upon reading the following, other limitations of existing or prior systems will become apparent to those of skill in the art

SUMMARY

This summary is provided to introduce certain concepts in a simplified form. The concepts are further described in the Detailed Description below and the drawings. This summary is not intended to identify essential features of the claimed subject matter or to limit the scope of the claimed subject matter.

The techniques introduced herein provide systems and methods for anonymizing various portions of information, action logs, end-user information, and/or other data sets that are stored in non-indexed storage systems. More specifically, various anonymization procedures are described for redacting UII and/or replacing UII in raw data sets with randomly generated information (RGI). The anonymization process is performed on a rolling basis as raw data sets are received. An anonymization mapping table maps (or associates) the replaced UII in the anonymized data sets to the RGI, and eventually all raw data sets can be deleted.

The anonymization procedures described herein overcome the indexing issues of the prior art because, in order to comply with a user's request to delete his/her account, the system merely needs to disassociate the UII corresponding to the end-user from the RGI in the anonymization mapping table. Once the UII is disassociated from the RGI, the UII is no longer traceable to an individual end-user. In one embodiment, the UII comprises user identifiers (UIDs) and the RGI comprises randomly generated identifiers (RIDs).

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

One or more embodiments of the present invention are illustrated by way of example and not limitation in the figures of the accompanying drawings, in which like references indicate similar elements.

FIG. 9 depicts an example table data tagged with metadata anonymization tags.

Figure 1:
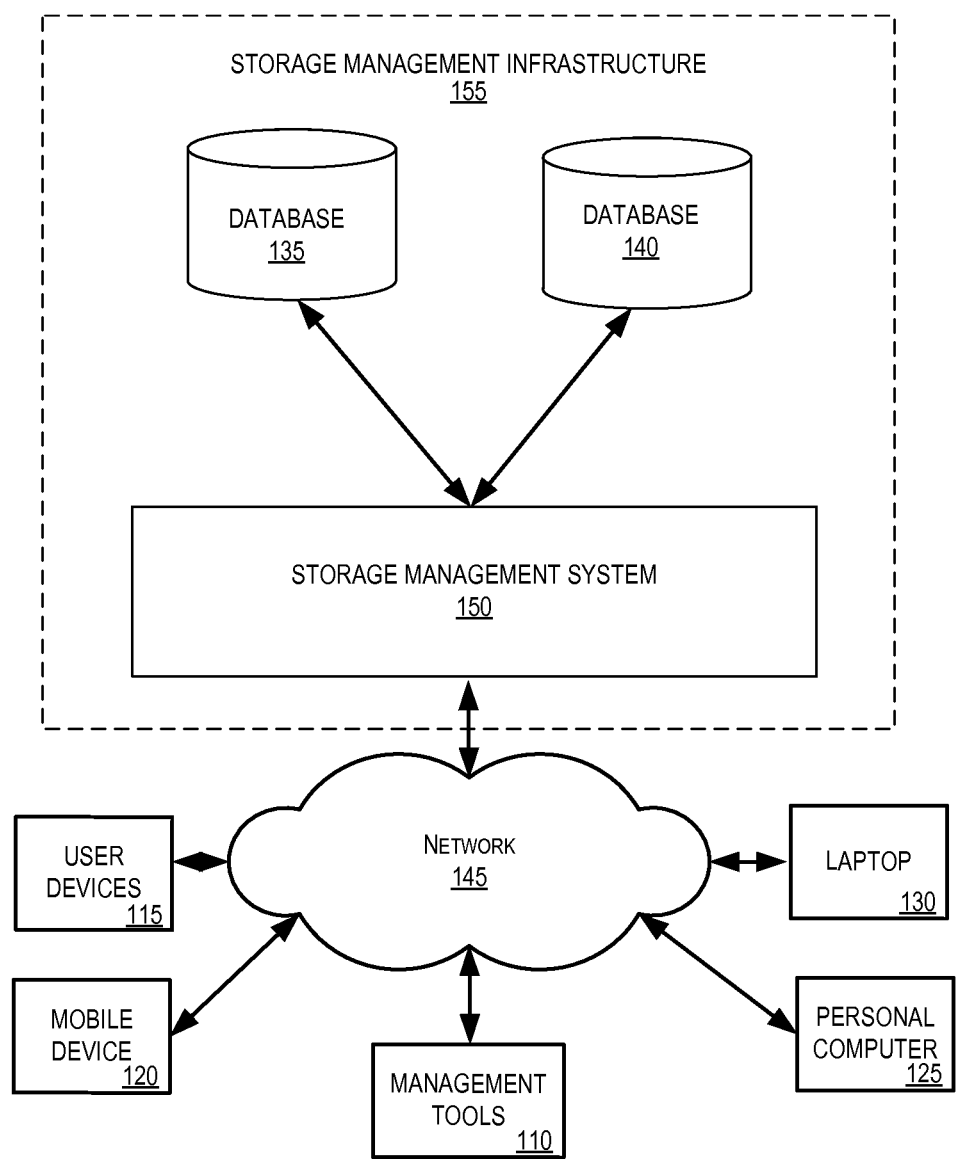
FIG. 1 depicts a block diagram illustrating an example of a networked-based environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to information privacy. More specifically, embodiments of the present invention relate systems and methods for anonymizing various portions of information, action logs, end-user information, and/or other data sets that are not indexed. Traditionally, companies that store vast amounts of end-user data have both front-end systems and back-end systems (e.g., data warehouse(s)). However, because of the nature and volume of data stored in back-end systems, at least some of the data in the back-end systems may not be indexed (i.e., index lookups are not available). This indexing issue becomes a considerable problem as end-users delete their accounts.

Various embodiments of the present invention overcome this issue. In one embodiment, the anonymization procedures described herein overcome the indexing issues of the prior art because, in order to comply with a user's request to delete his/her account, the system merely needs to disassociate the UII corresponding to the end-user from the RGI in the anonymization mapping table. In one embodiment, the UII comprises UIDs and the RGI comprises RIDs.

In one embodiment, in order to comply with a user's requests to delete his/her account, an anonymization management system anonymizes UII that is located in a (back-end) data warehouse. As part of the anonymization, the system identifies a non-indexed raw data set from a data warehouse that meets an anonymization criteria. The raw data set includes one or more instances of UII. The system then accesses an anonymization identification map that associates the UII with RGI and generates an anonymized data set using the anonymization identification map. In this case, the anonymized data set is an anonymized version of the raw data set.

In one embodiment, performing the anonymization procedure and/or otherwise generating the anonymized data set using the anonymization identification map includes replacing the one or more instances of UII in the raw data set with an associated RGI. This process can include replacing UIDs with RIDs.

In one embodiment, performing the anonymization procedure and/or otherwise generating the anonymized data set using the anonymization identification map includes performing an anonymization process on a complex structure such as, for example, a Uniform Resource Locator (URL). This process can include scanning the raw data set to identify a complex structure, determining a primary UII associated with the complex structure, parsing the complex structure to identify a key associated with the UII, identifying a value associated with the key, and replacing the value with RGI associated with the primary UII.

In one embodiment, performing the anonymization procedure and/or otherwise generating the anonymized data set using the anonymization identification map includes performing an anonymization process on data that is tagged with metadata anonymization tags. This process can include identifying a type of data in a column of the raw data set based on a metadata tag associated with the column, determining an action associated with the metadata tag, and performing the action to anonymize or sanitize the data in the column.

In one embodiment, the system disassociates UII corresponding to an end-user from the RGI in the anonymization mapping table in order to comply with the end-user's request to delete his/her account. Once the UII is disassociated from the RGI, UII is no longer traceable to an individual end-user. This process can include accessing an anonymization mapping table, disassociating a UID from the corresponding RID, and marking the UID as inactive.

In one embodiment, as part of the anonymization process, the system performs a verification procedure to ensure that the anonymization is properly performed without major error. The verification procedure can include counting a first number of rows in a raw data set prior to performing the anonymization process, counting a second number of rows in the data set subsequent to performing the anonymization process, and comparing the first number of rows and the second number of rows to determine if the anonymization process exceeds an error threshold.

The techniques introduced herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary channels or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in other embodiments," and the like generally mean the particular feature, structure, or characteristic following the phrase is included in at least one embodiment of the present invention and may be included in more than one embodiment of the present invention. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "module" or "engine" refers broadly to software, hardware, or firmware (or any combination thereof) components. Modules or engines are typically functional components that can generate useful data or other output using specified input(s). A module may or may not be self-contained. An application program (also called an "application") may include one or more modules, or a module can include one or more application programs.

The terms "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

I. Environment

FIG. 1 depicts a block diagram illustrating an example of a networked-based environment 100 in which some embodiments of the present invention may be utilized. Companies can generate and store a tremendous amount of data (e.g., photographs, messages, e-mails, electronic documents, or healthcare records) and related analytics (e.g., usage analytics) which can contain user identifiable information (UII). The data can be submitted through various management tools 110, user devices 115, mobile devices 120, personal computers 125, laptops 130, and/or other devices to allow the data to be stored on one or more databases 135 and 140. As illustrated in FIG. 1, these devices and tools may use network 145 to submit and retrieve information from the databases 135 and 140. Various embodiments of the present invention use storage management system 150 within storage management infrastructure 155 to anonymize UII that is stored on databases 135 and 140.

User device 115 can be any computing device capable of receiving user input as well as transmitting and/or receiving data via the network 145. In one embodiment, user device 115 is a conventional computer system, such as a desktop 125 or laptop computer 130. In another embodiment, user device 115 may be mobile device 120 having computer functionality, such as a personal digital assistant (PDA), mobile telephone, smart-phone or similar device. User device 115 is configured to communicate with access management system 150, and/or the financial account provider via the network 145. In one embodiment, user device 115 executes an application allowing a user of user device 115 to interact with the access management system 150. For example, user device 115 can execute a browser application to enable interaction between the user device 115 and access management system 150 via the network 145. In another embodiment, user device 115 interacts with access management system 150 through an application programming interface (API) that runs on the native operating system of the user device 208, such as iOS® or ANDROID™.

User devices 115 can be configured to communicate via the network 145, which may comprise any combination of local area and/or wide area networks, using both wired and wireless communication systems. In one embodiment, network 145 uses standard communications technologies and/or protocols. Thus, network 145 may include links using technologies such as Ethernet, 802.11, worldwide interoperability for microwave access (WiMAX), 3G, 4G, CDMA, digital subscriber line (DSL), etc. Similarly, the networking protocols used on network 145 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 145 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

Figure 2:
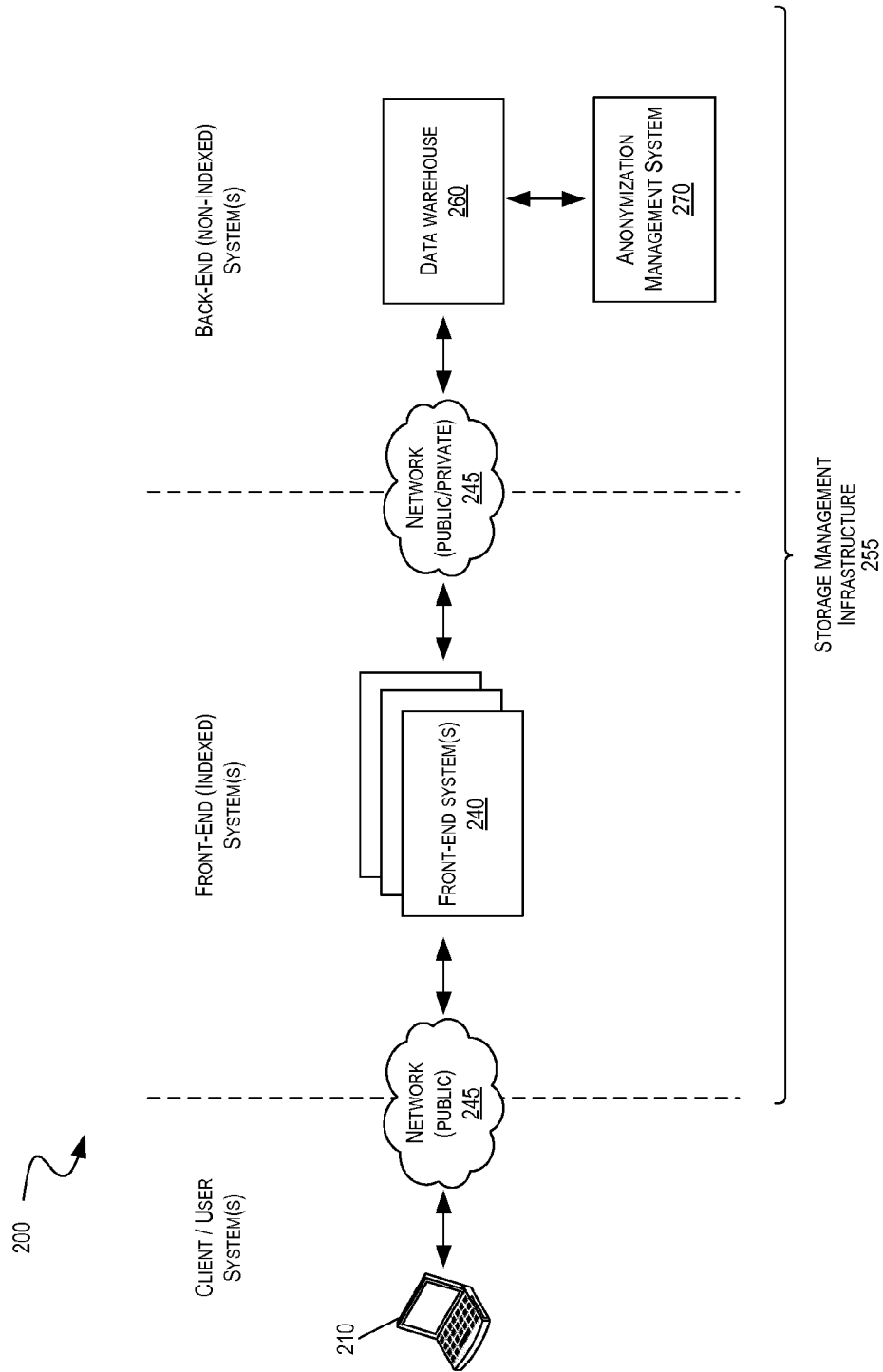
FIG. 2 depicts a block diagram illustrating an example of a storage infrastructure.

FIG. 2 depicts a block diagram illustrating a more detailed example of a storage infrastructure 255 in a networked-based example environment 200, according to an embodiment. The storage infrastructure 255 and the networked-based example environment 200 can be the storage infrastructure 155 and the networked-based example environment 100 of FIG. 1, respectively, although other configurations are possible. As shown, the networked-based example environment 200 includes various client or user system(s) and a storage management infrastructure 255.

The storage management infrastructure 255 can include various front-end system(s) and back-end system(s) that can be physically and/or functionally distributed. As shown, the storage management infrastructure 255 includes front-end system 240, a back-end data warehouse 260, and an anonymization management system 270. The client or user system(s) 210 can be configured to communicate via the network 245 with the front-end system(s) 240, the front-end system(s) can be configured to communicate with the client or user system(s) 210 and the data warehouse 260 via the network 245, and the data warehouse 260 can be configured to communicate with the front-end system(s) 240 and an anonymization management system 270 via the network 245.

The front-end system(s) 240 can comprise various operational systems and/or relational databases. The operational systems are typically optimized for preservation of data integrity and speed of recording transactions through use of database normalization and an entity-relationship model.

Fully normalized database designs often result in information being stored in hundreds or even thousands of tables. Relational databases are efficient at managing the relationships between these tables. The databases have very fast insert/update performance because only a small amount of data in those tables is affected each time a transaction is processed. For performance and other purpose, older data is periodically purged from the front-end (operational) system(s) 240 to the data warehouse 260. In one or more embodiments, the front-end system(s) 240 include, but are not limited to, user databases, HBASE, Haystack, and server logs.

The back-end data warehouse 260 is a "functionally" central repository for data that is purged from multiple front-end (operational) system(s) 240. The back-end data warehouse 260 is "functionally" central because it can be physically and/or functionally distributed. For example, the back-end data warehouse 260 can include a user space for server logs associated with end-user data that can be sharded across any number of physical distributed machines. The back-end data warehouse 260 can store current as well as historical data. For example, the back-end data warehouse 260 can store historical user data that is ten years or older. The back-end data warehouse 260 is commonly used for operational and development purposes including, but not limited to, data analysis.

The back-end data warehouse 260 may take a variety of forms. In one embodiment, the back-end data warehouse 260 is configured with Hive. Hive is a data warehouse system for HDFS that facilitates easy data summarization, ad-hoc queries, and the analysis of large datasets stored in Hadoop compatible file systems. However, as discussed above, data in Hadoop (as well as some other systems) is stored as files rather than as a database structure. Consequently, specific portions of end-user information cannot be looked up via index lookups without reading the entire file.

Thus, to remove non-indexed end-user logs when an end-user deletes his/her account, the system must scan each file in the data warehouse for UII, replace or redact the UII with RGI and subsequently rewrite the entire file. This is an arduous process in that it is both time consuming and processor intensive.

The anonymization management system 270 can comprise various processing systems, index server(s), etc., that perform the various anonymization procedures discussed herein. The various component, functions, and or tools that can be associated with and/or included within an anonymization management system are discussed in greater detail with reference to FIG. 3.

Figure 3:
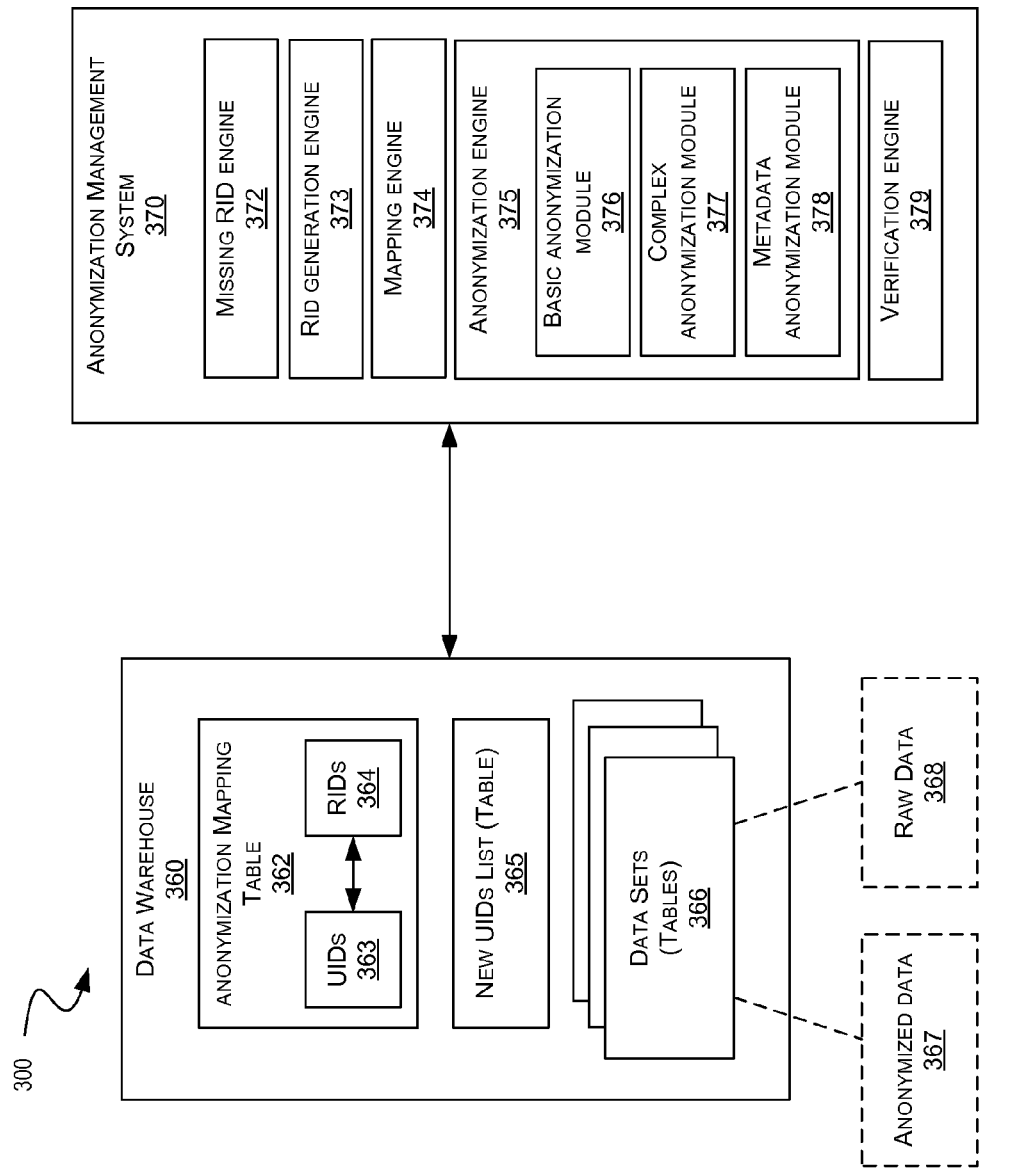
FIG. 3 depicts a block diagram illustrating the a back-end storage infrastructure.

FIG. 3 depicts a block diagram illustrating the a back-end storage infrastructure 300, according to an embodiment. The storage infrastructure 300 can be the storage infrastructure 155 of FIG. 1, although alternative configurations are possible. In the example of FIG. 3, the storage infrastructure 300 includes a data warehouse 360 and an anonymization management system 370. Other systems, databases, and/or components are also possible.

The data warehouse 360, although illustrated as comprised of distributed components (physically distributed and/or functionally distributed), could be implemented as a collective element. The data warehouse 360 includes various tables of data. As shown, the data warehouse 360 includes an anonymization mapping table 362, a new UIDs list (or table) 365, and a plurality of data sets (or tables) 366. In some embodiments, some or all of the tables can be combined and/or further separated in any convenient or known manner.

The anonymization mapping table 362 includes a mapping or association between various UII and RGI. As discussed above, there are various types of UII including, but not limited to, UIDs, Internet Protocol (IP) addresses, cookies or browser, birth names, physical addresses, telephone numbers, end-user generated content, etc. As shown in this example, the anonymization mapping table 362 includes various associations between UIDs and RIDs. Each UID uniquely identifies an end-user of the storage management system. The associated RIDs are anonymous references that are used in place of the UIDs in anonymized data such as, for example, anonymized data 367. The RIDs are generated completely randomly and are in no way correlated to the corresponding UID. That is, given an RID, one cannot reverse engineer a UID. As described below, the anonymization management system 370 associated new UIDs with a corresponding or associated RID. Once associated with an RID, a UID is considered to be active. If that UID is later disassociated from an RID because an end-user deletes his/her account, then the disassociated UID and RID are considered inactive. In some embodiments inactive UIDs and RIDs are not reused by the system.

The new UIDs list (table) 365 includes a list of new UIDs that are not yet associated with an RID. The anonymization management system 370 generates this table periodically (e.g., daily based on new data trigger or pipeline). This process is discussed in greater detail with reference to FIG. 5.

Each data set (table) 366 may include anonymized data 367 and/or raw data 368 depending on its age and/or it's state in a data anonymization lifecycle. The data anonymization lifecycle is discussed in greater detail with respect to the data timeline shown in FIG. 4. The raw data 368 can include user data and other data that is continuously and/or periodically purged from or pushed by the front-end data systems. The raw data 368 can include user UII that can identify end-users. For example, the raw data can include end-user data including, but not limited to, addresses, credit card information, photographs, e-mails, healthcare records, financial records, electronic documents, messages, associations with other end-users, and other types of information. In one embodiment, the anonymized data 367 is an anonymized version of the raw data. For example, the anonymized data 367 may have some UII redacted and/or replaced. As shown, all UII is redacted but UIDs which are replaced with corresponding RIDs. In this manner, the anonymization management system 370 can still identify user data using the anonymization mapping table 362 as long as the UID is active (i.e., not disassociated from its corresponding RID).

The anonymization management system 370, although illustrated as comprised of distributed components (physically distributed and/or functionally distributed), could be implemented as a collective element. In some embodiments, some or all of the modules, and/or the functions represented by each of the modules, can be combined in any convenient or known manner. Furthermore, the functions represented by the modules and/or engines can be implemented individually or in any combination thereof, partially or wholly, in hardware, software, or a combination of hardware and software. Additionally, although not shown, the anonymization management system can comprise one or more index servers.

The anonymization management system 370 includes a missing RID engine 372, an RID generation engine 373, an anonymization engine 375, and a verification engine 379. The missing RID engine 372 is configured to access new (raw) table data, scan the data for UIDs, and determine which of the scanned UIDs, if any, are new. The missing RID engine 372 then stores the new UIDs in the new UIDs list (table) 365. Alternatively or additionally, the missing RID engine 372 can generate one or more new UIDs list (table) 365. The RID generation engine 373 is configured to generate new RIDs for each new UID in the new UIDs list. In one embodiment, the RID generation engine 373 generates RIDs in response to batched requests.

The mapping engine 374 performs the mapping (association) and de-mapping (disassociation) of UIDs to RIDs and UIDs from RIDs, respectively. The mapping engine 374 allows the anonymization management system 370 to identify an end-user in the anonymized data by accessing an active UID of a user, determining an associated or corresponding RID, and then identifying the user in the anonymized data 367 based on the corresponding RID. The association process is discussed in greater detail with respect to FIG. 5. Additionally, the mapping engine 374 allows the anonymization management system 370 disassociate a UID from an RID (i.e., deactivate an active UID). Deactivating a UID makes it such that an end-user can no longer be identified in the anonymized data 367. As will be discussed, after raw data 368 is removed, an end-user that deletes his/her account, and thus deactivates his/her UID, is no longer identifiable by the anonymization management system.

The anonymization engine 375 includes various modules that perform the various anonymization techniques and/or processes described herein. As shown, the anonymization engine 375 includes a basic (or stock) anonymization module 366, a complex anonymization module 367, and a metadata anonymization module 368.

The basic (or stock) anonymization module 366 performs a basic anonymization process. The basic anonymization process typically involves scanning the data sets and replacing instances of UIDs with RIDs. Other UII (besides UIDs) are typically redacted. The process of basic (or stock) anonymization is discussed in greater detail with respect to FIGS. 6 and 7A.

The complex anonymization module 367 performs a complex anonymization process. The complex anonymization process typically involves scanning data sets and anonymizing complex (or nested) structures such as, for example, URLs. This process involves identifying keys that represent UII and replacing and or redacting that information. The process of complex anonymization is discussed in greater detail with respect to FIGS. 6 and 7B.

The metadata anonymization module 368 performs a metadata anonymization process or technique. The metadata driven anonymization process allows the system to anonymize column data based on metadata anonymization tags that explain or otherwise indicate the type of data that is contained in the column. The metadata anonymization process or technique is discussed in greater detail with respect to FIGS. 8 and 9.

The verification engine 379 performs various verification processes on the anonymized data to ensure that the process is effectively and efficiently completed. An example of a verification process is discussed in greater detail with reference to FIG. 11.

Figure 4:
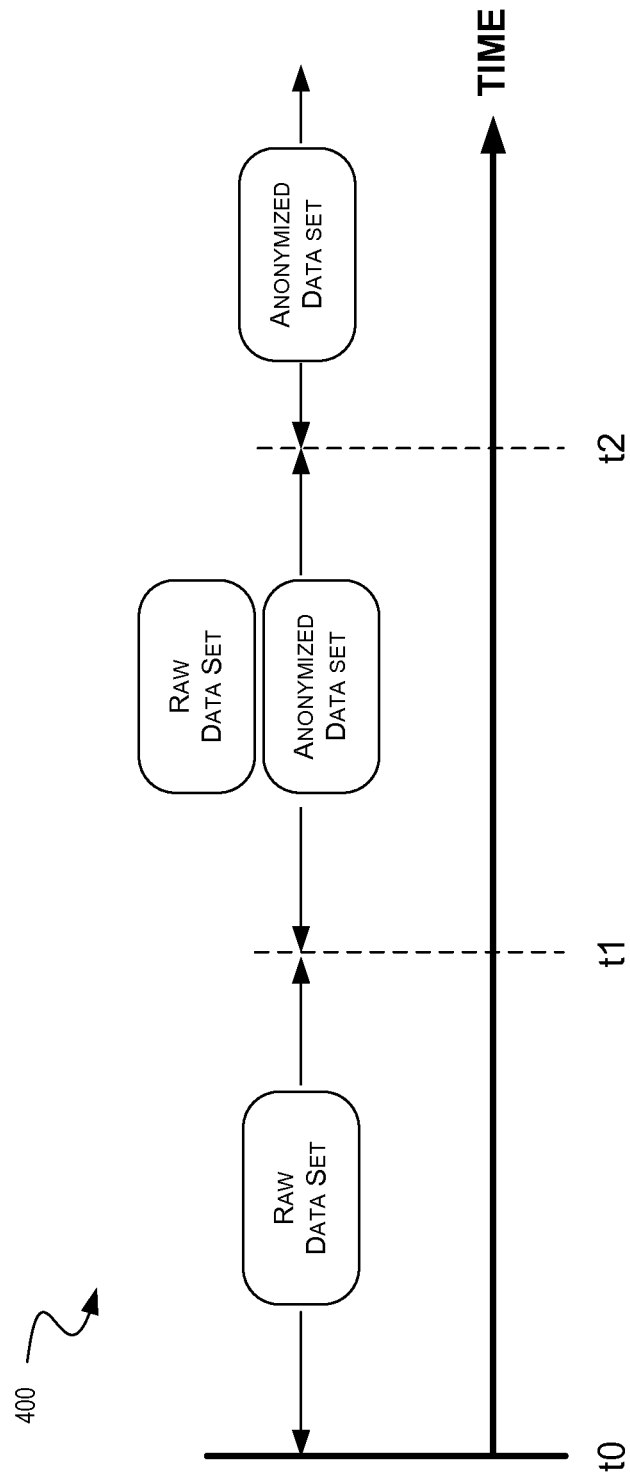
FIG. 4 depicts a timeline illustrating an anonymization lifecycle of a data set in data warehouse.

FIG. 4 depicts a timeline 400 illustrating an anonymization lifecycle of a data set in data warehouse, according to an embodiment. As discussed, raw data sets are continuously and/or periodically pushed or purged from the front-end systems to the data warehouse.

In one embodiment, the raw data can be immediately anonymized; however, in other embodiments, the system keeps raw data for at least a time t2. In this way all end-user UII is anonymized by t2. The time t2 can be the time by which a company has promised to remove or scrub all UII if, for example, an end-user deletes his/her account. For example, if t2 is set to ninety days and the end-user deletes his/her account at t0, then the newest UII created with respect to that end-user (e.g., the UII created the same day that the use deleted his/her account) will be deleted by the ninety day mark (i.e., t2). Older end-user data can be removed earlier because the user data is anonymized on a rolling basis. That is, the user data that is older than ninety days at the time the user deletes his/her account is already anonymized and thus, the user can only be associated with this information using the anonymization mapping table. However, when the end-user deletes his/her account, the association between the UID and the RID is immediately severed and thus the user data that is older than ninety days at the time the user deletes his/her account is immediately and forever untraceable back to that user.

The example timeline 400 also illustrates a time t1. The time t1 can be the time at which the raw data set is anonymized. As shown, this time can prior to time t2 which can be helpful if there are issues anonymizing the data that are discovered during, for example, the verification process. Time t1 can be, for example, at seventy days. In some embodiments, time t1 and time 2 can be the same.

II. Methods for Anonymization

Figure 5:
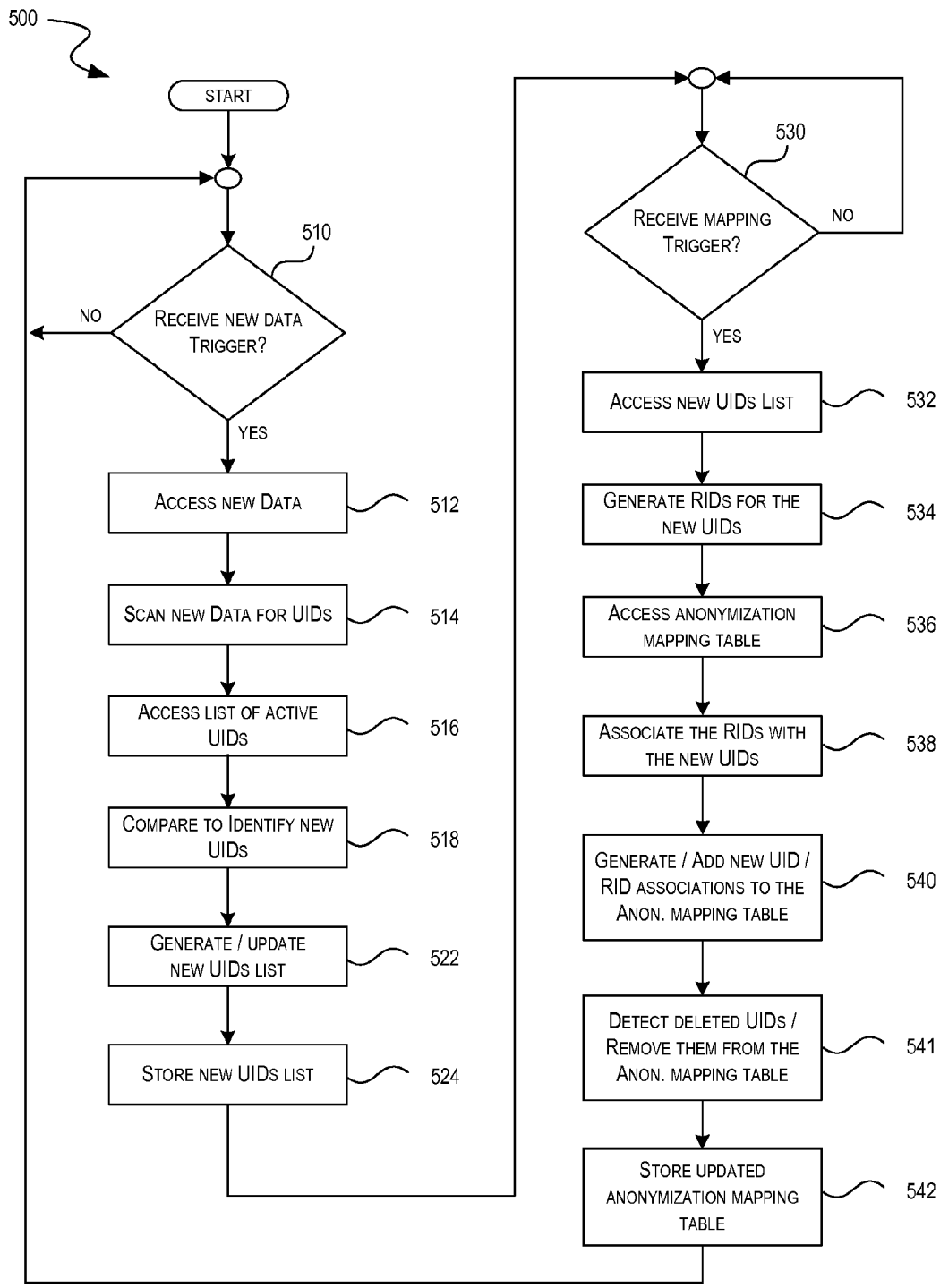
FIG. 5 depicts a flowchart illustrating an example process for generating and/or updating an anonymization mapping table.

FIG. 5 depicts a flowchart illustrating an example process 500 for generating and/or updating an anonymization mapping table, according to an embodiment. The operations illustrated in FIG. 5 may be performed in various embodiments by an anonymization management system 270 of FIG. 2, a processor, and/or other modules, engines, components or tools associated with storage management system 150 of FIG. 1.

To begin, at a determination step 510, the anonymization management system determines if it has received a new data trigger. The new data trigger can be any indicator to access the new data in the data warehouse. For example, the new data trigger can be a pipeline operation that runs daily, weekly, monthly, etc. If the new data trigger is received, then, at step 512, the anonymization management system accesses the new data in the data warehouse. In one or more embodiments, data from the front-end systems including server log data and other data is continuously being purged from or pushed out by the front-end systems to the data warehouse.

At step 514, the anonymization management system scans the new data for UIDs. At step 516, the anonymization management system accesses the list of active UIDs. The list of active UIDs may be taken from the anonymization mapping table or may be stored and maintained in a separate table in the data warehouse (although not shown with respect to FIG. 3). At step 518, the anonymization management system compares the scanned UIDs to the list of the active UIDs to identify new UIDs and, at step 522, the new UIDs are added to a new UID list. In some embodiments, a new UID list can be generated and/or updated. At step 524, the anonymization management system stores the new UID list or table in the data warehouse.

At a determination step 530, the anonymization management system determines if it has received a mapping trigger. The mapping trigger can be any indicator to access the new UIDs and associate the new UIDs with RIDs (e.g., via one or more batched requests). The mapping trigger can occur periodically. For example, the mapping trigger can occur daily, weekly, etc. If the mapping trigger is received, then, at step 532, the anonymization management system accesses the list of new UIDs from the data warehouse. At step 534, the anonymization management system generates RIDs for each of the new UIDs. At step 536, the anonymization management system accesses the anonymization mapping table, if it exists. At step 538, the anonymization management system associates the RIDS with the new UIDs from the new UID list and, at step 540, adds the new associations to the anonymization mapping table or generates the anonymization mapping table (if it did not previously exist) with the new associations. At step 541, the anonymization management system Lastly, at step 542, the updates anonymization mapping table is stored back in the data warehouse.

Figure 6:
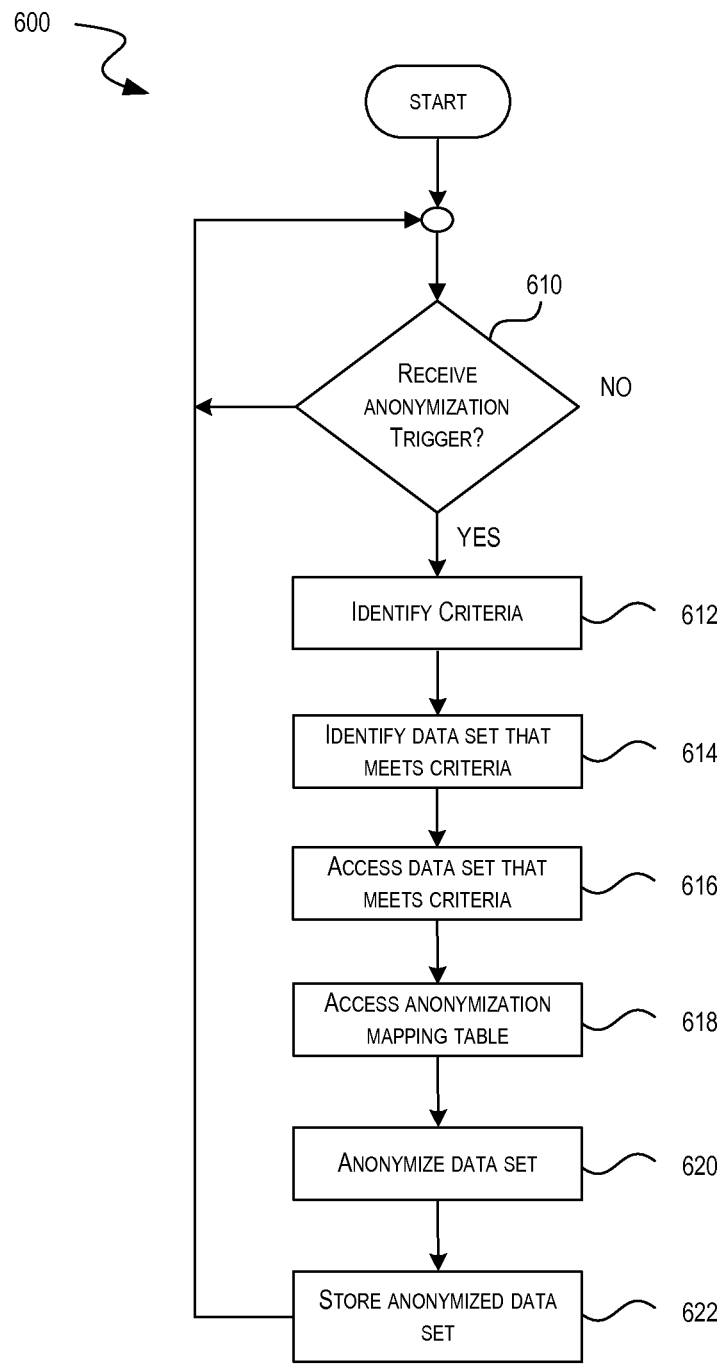
FIG. 6 depicts a flowchart illustrating an example process for anonymization of a data set.

FIG. 6 depicts a flowchart illustrating an example process 600 for general anonymization of a data set, according to an embodiment. The operations illustrated in FIG. 6 may be performed in various embodiments by an anonymization management system 270 of FIG. 2, a processor, and/or other modules, engines, components or tools associated with storage management system 150 of FIG. 1.

To begin, at a determination step 610, the anonymization management system determines if it has received an anonymization trigger. The anonymization trigger can be any indicator to commence the anonymization process. The anonymization trigger can be an operation that is triggered daily, weekly, monthly, etc. If the anonymization trigger is received then, at step 612, the anonymization management system identifies criteria that the data to be anonymized must meet. In one embodiment, the criteria can be an age of a specific table or a column within a table. For example, the criteria may be that the table or column data meet or exceed a specified age as determined for the data of origination in the data warehouse.

Once the criteria is identify or otherwise determined, at step 614, the anonymization management system identifies a data set from the data warehouse that meets the criteria and, at step 616, accesses the data set that meets the criteria. The data set may comprise a subset data in the data warehouse including one or more tables having one or more columns. At step 618, the anonymization management system accesses the anonymization mapping table, and, at step 620, anonymizes the data set. As discussed herein, anonymization can occur in a variety of manners. Various examples of basic, complex and metadata driven anonymization processes and techniques are discussed with respect to FIGS. 7-9. Lastly, at step 622, the anonymization management system stores the anonymized data set in the data warehouse.

Figure 7A:
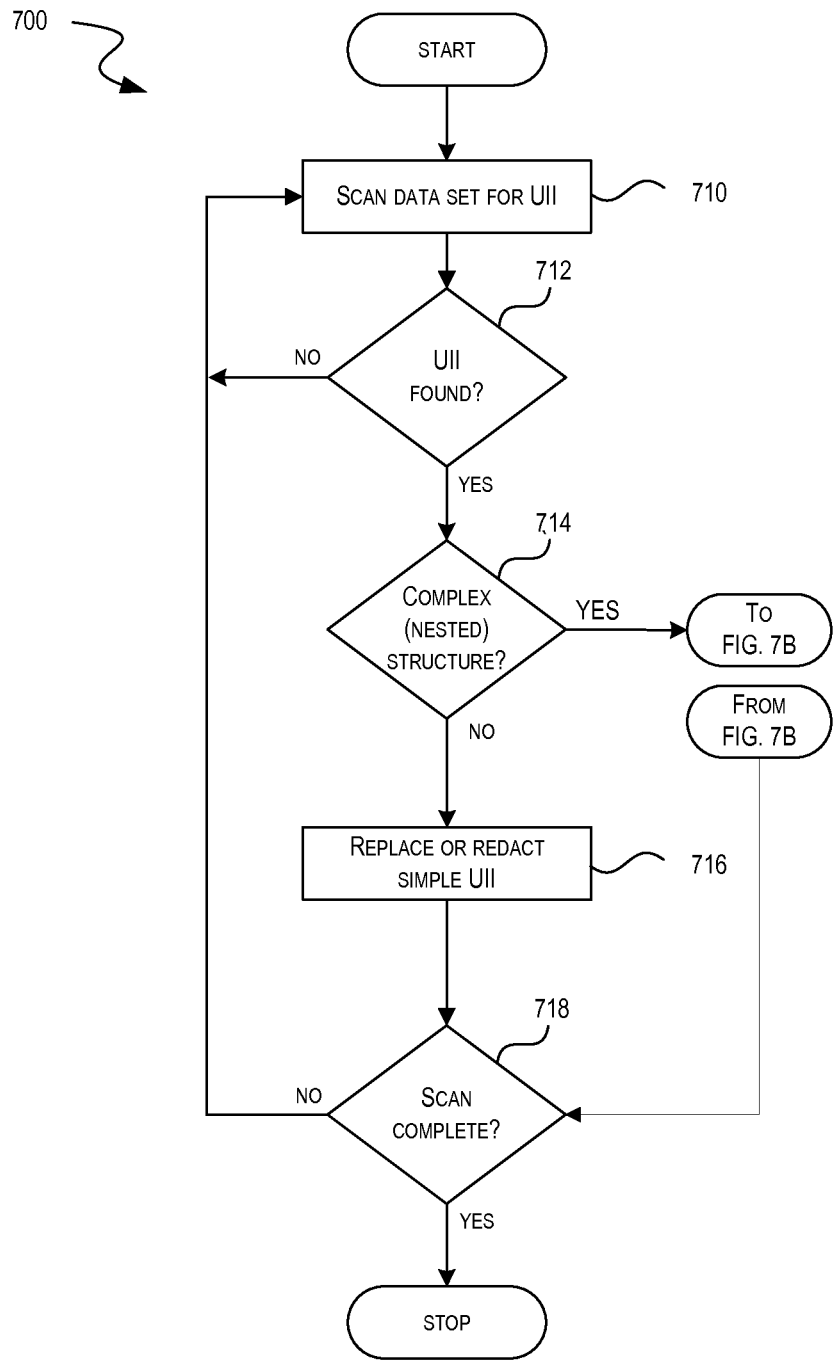
FIGS. 7A and 7B depict a flowchart illustrating an example process for basic anonymization and complex anonymization, respectively.
Figure 7B:
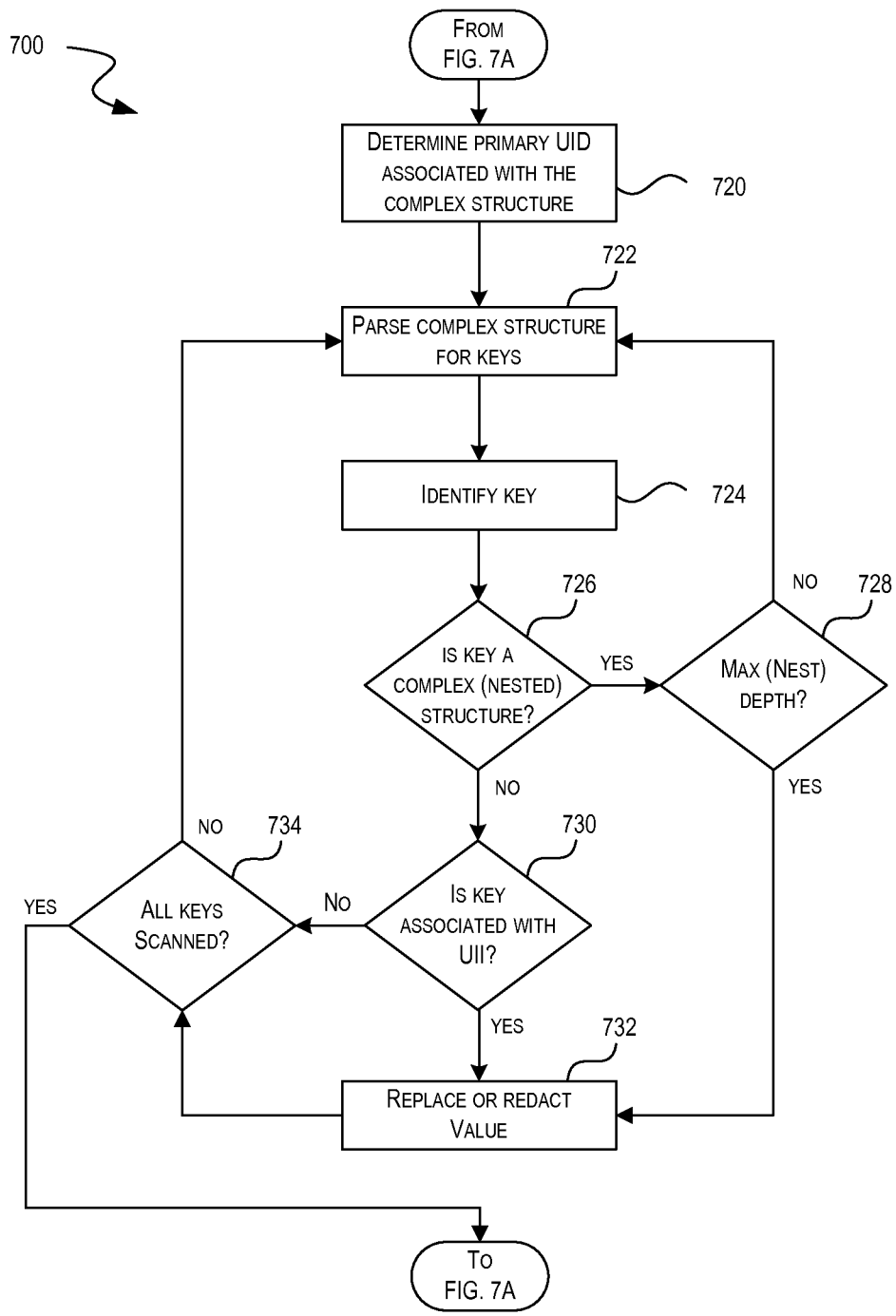

FIGS. 7A and 7B depict a flowchart illustrating a process 700 for anonymizing a data set, depict a flowchart illustrating an example process 700 for anonymizing a data set, according to an embodiment. More specifically, FIG. 7A is primarily directed to the process of basic (or stock) anonymization and FIG. 7B is primarily directed to the process of complex anonymization. The operations illustrated in FIGS. 7A and 7B may be performed in various embodiments by an anonymization management system 270 of FIG. 2, a processor, and/or other modules, engines, components or tools associated with storage management system 150 of FIG. 1.

A. Basic (Stock) Anonymization

Stock anonymization typically involves replacing UIDs in a raw data set with RIDs. All other UII is nulled out or otherwise redacted. For example, physical address, browser cookies, email addresses, etc., are all nulled out.

FIG. 7A depicts a flowchart illustrating an example process 700 for basic anonymization, according to an embodiment. As described herein, anonymization is considered basic if it does not involve a complex (or nested) structure such as, for example, a Uniform Resource Locator (URL), JavaScript Object Notation (JSON) data, and/or other data that can include one or more instance of UII. To begin, at step 710, the anonymization management system scans a data set for UII. For example, the anonymization management system can scan for UID in the data set.

At a determination step 712, the anonymization management system determines whether a data element with UII is found or likely to be found in a data element with a nested structure. At a determination step 714, the anonymization management system determines whether the data element is a complex (nested) structure. If so, the process for complex anonymization is applied to the data element. However, if the data element is not a complex (nested) structure, then, at step 716, the UII is redacted or replaced. Typically, with basic (or stock) anonymization, all UII is redacted except UIDs which are replaced with RIDs. However, in some embodiments, various UII besides UIDs are replaced with random identifiers rather than being redacted.

Once the data item is anonymized via either the basic anonymization process described above or the complex anonymization process described below, at a determination step 718, the anonymization management system determines whether the scan of the data set is complete. If the scan is complete the scan stops, otherwise the anonymization management system continues to scan the data set.

B. Complex Anonymization—e.g., URL Anonymization

FIG. 7B depicts a flowchart illustrating a process 700 for complex anonymization, according to an embodiment. As described herein, anonymization is considered complex if it involves a complex (or nested) structure such as, for example, a Uniform Resource Locator (URL), JavaScript Object Notation (JSON) data, and/or other data structures that can include more than one easily identifiable instance of UII.

To begin, the anonymization management system determines and/or otherwise identifies the primary UID associated with the complex structure. The primary UID is the UID that performed the action or event on the complex structure or otherwise interacted with the complex structure (e.g., clicked on the URL). For example the primary UID associated with the complex structure can be identified by determining the UID associated with the row of data that contains the complex structure. However, it is appreciated that the primary UID associated with the complex structure could be determined and/or otherwise identified in any number of other ways.

At step 722, the anonymization management system parses the complex structure for keys. For example, if the complex structure is the URL "www.facebook.com/profile.php?id=506068&pid=4&aid=100," then the anonymization management system could parse the URL for the id, aid, and pid keys. At decision step 726, the anonymization management system determines if the key is itself a complex structure. If so, the anonymization management system regressively parses and/or otherwise identifies keys up until a max (nest) depth. At decision step 728, the anonymization management system determines if the system has reached the max (nest) depth. If so, the regression stops and the key is redacted, essentially also redacting any additional keys at greater depths. Otherwise, if the system has reached the max (nest) depth, the anonymization management system continues to parse for keys.

At decision step 730, the anonymization management system determines if the current key is associated with UII. If so, at step 732, the UII is replaced or redacted. For example, UIDs may be replaced with RGI and other UII may be redacted. If the key is not associated with UII or if the UII has been replaced or redacted, at a decision step 734, the anonymization management system determines if all keys have been scanned for the data element. If so, the anonymization management system returns the anonymization procedure in FIG. 7A. Otherwise, the anonymization management system continuous parsing the complex structure for keys.

C. Metadata Driven Anonymization

Figure 8:
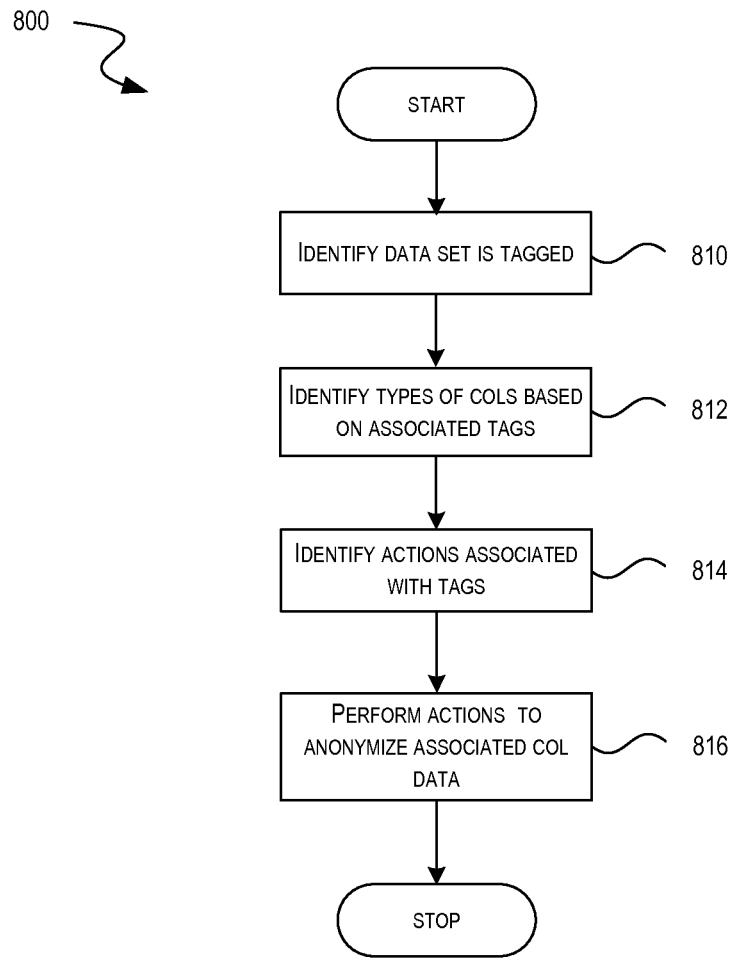
FIG. 8 depicts a flowchart illustrating an example process 800 for performing anonymization using a metadata driven anonymization technique.

FIG. 8 depicts a flowchart illustrating an example process 800 for performing anonymization using a metadata driven anonymization technique, according to an embodiment. The metadata driven anonymization process 800 allows the system to anonymize column data based on metadata anonymization tags that explain or otherwise indicate the type of data that is contained in the column.

To begin, at step 810, the anonymization management system identifies that a data set is tagged with one or more metadata anonymization tags. A data set can be tagged by, for example, the developer that is writing the script or code that uses the data. That is, a developer may write a pipeline script to pull certain data and thus, best knows and understands what the data in each column represents. Thus, tagging the data saves the system time in having to scan the entire data set and make a determination as to how to anonymize the data.

At step 812, the anonymization management system identifies types the types of columns based on the associated tags. For example, the column can be a UID column, a name column, an address column, a browser or cookie column, etc. At step 814, the anonymization management system identifies actions associated with the tags. For example, a simple action may be to replace or redact the data. That is a UID may be replaced with and RID or a cookie may be redacted. An action may also be more sophisticated. For example, the action might be to delete the last key of a URL. Any action is possible. At step 816, the anonymization management system performs or executes the actions to anonymize (or sanitize) the associated column data.

FIG. 9 depicts an example table data 900 that is tagged with metadata anonymization tags for aiding in and/or otherwise facilitating metadata driven anonymization of the column data. Table data 900 is generally self-explanatory based on the above detailed description, but some details will now be provided.

Table 900 includes a plurality of columns and rows. In this example each row represents data associated with a particular user or UID and each column identifies the particular information that is stored for that user. In example table 900, the following columns are shown: UID, name, email address, IP address, browser, URL, and other. Additional or fewer columns are possible. Further, although not shown, any table entry can include no data or null data.

D. Deleting an End-User Account

Figure 10:
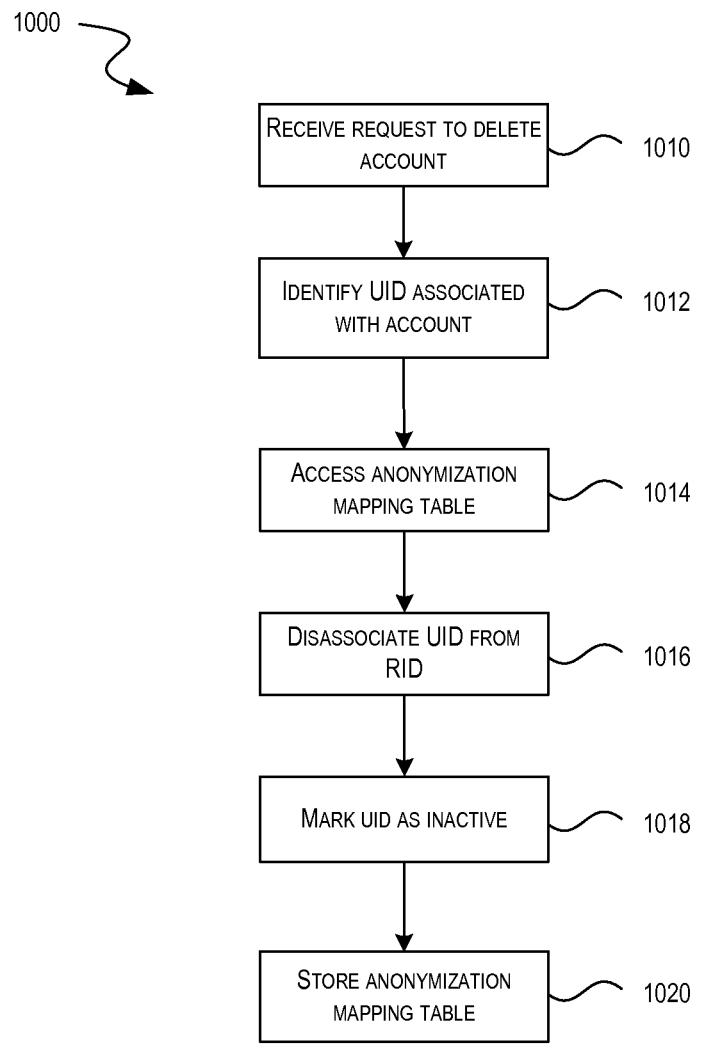
FIG. 10 depicts a flowchart illustrating an example process for disassociating UII from RGI in in an anonymization mapping table.

FIG. 10 depicts a flowchart illustrating an example process 1000 for disassociating UII from RGI in in an anonymization mapping table, according to an embodiment. More specifically, process 1000 illustrates the process of disassociating a UID from an RID responsive to an account delete request from an end-user. The operations illustrated in FIG. 10 may be performed in various embodiments by an anonymization management system 270 of FIG. 2, a processor, and/or other modules, engines, components or tools associated with storage management system 150 of FIG. 1.

At step 1010, the anonymization management system receives an indication that an end-user has requested an account deletion. For example, a front-end system may receive an a request from and end-user to delete his/her account and forward the indication on to the anonymization management system. At step 1012, the anonymization management system identifies the UID associated with the end-user that wants to delete his/her account. At step 1014, the anonymization management system accesses the anonymization mapping table and, at step 1016, disassociates the UID from the RID. At step 1018, the anonymization management system marks the UID as inactive. Lastly, at step 1020, the anonymization management system stores (or otherwise saves) the anonymization mapping table in the data warehouse.

III. Anonymization Verification

Figure 11:
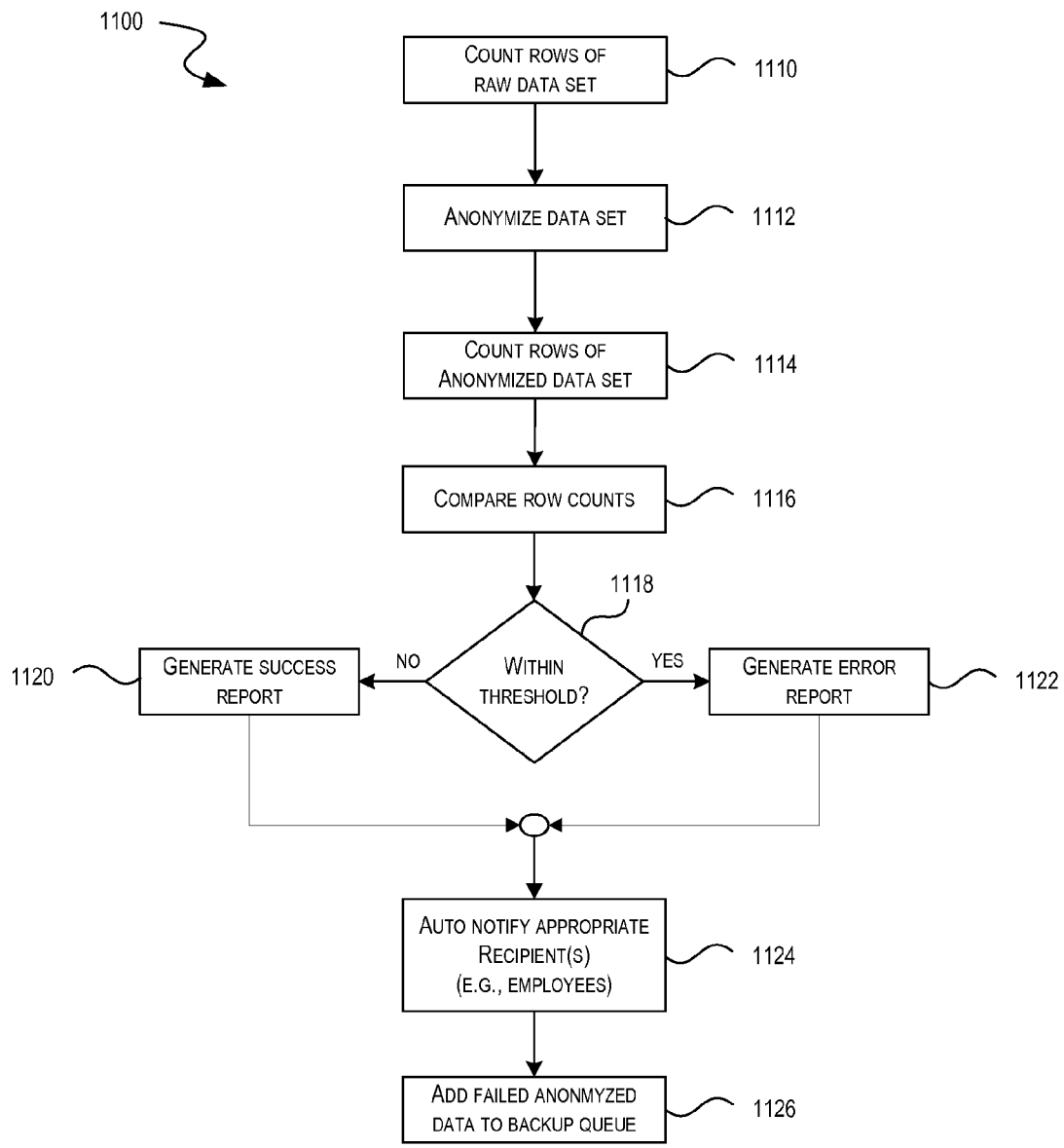
FIG. 11 depicts a flowchart illustrating an example process for verifying an anonymization process performed on a data set.

FIG. 11 depicts a flowchart illustrating an example process 1100 for verifying an anonymization process performed on a data set, according to an embodiment. The operations illustrated in FIG. 11 may be performed in various embodiments by an anonymization management system 270 of FIG. 2, a processor, and/or other modules, engines, components or tools associated with storage management system 150 of FIG. 1.

To begin, at step 1110, the anonymization management system counts the rows of a raw data set prior to an anonymization process. At step 1112, the data set is anonymized. At step 1114, the anonymization management system counts the rows of the anonymized data set and, at step 1116, compares the counts. That is, the anonymization management system compares the number of rows prior to and after anonymization. At a decision step 1118, the anonymization management system determines whether the comparison of the number of rows prior to and after anonymization fall within an error threshold. If so, at step 1120, the anonymization management system generates a report indicating success. If not, at step 1122, the anonymization management system generates a report indicating failure.

At step 1124, the anonymization management system generates automatic notifications and identifies the appropriate recipients of the reports (e.g., employees or other users). For example, the anonymization management system may determine that table data belonging or derived from a specific developer is not properly being anonymized. In this case, the appropriate developer (i.e., employee) is identified and notified so that he/she can rectify the issue. In some embodiments, a level of importance and/or urgency (e.g., 1-10) may accompany the report. For example, if the deadline to anonymize a user's data is approaching and the data has repeatedly failed, then the level of urgency can be gradually and/or significantly increased. Lastly, in step 1126, any data that failed the anonymization process is added to a backup queue in another attempt to anonymize the data the next time that the anonymization process is triggered.

IV. Social Networking System Overview

Figure 12:
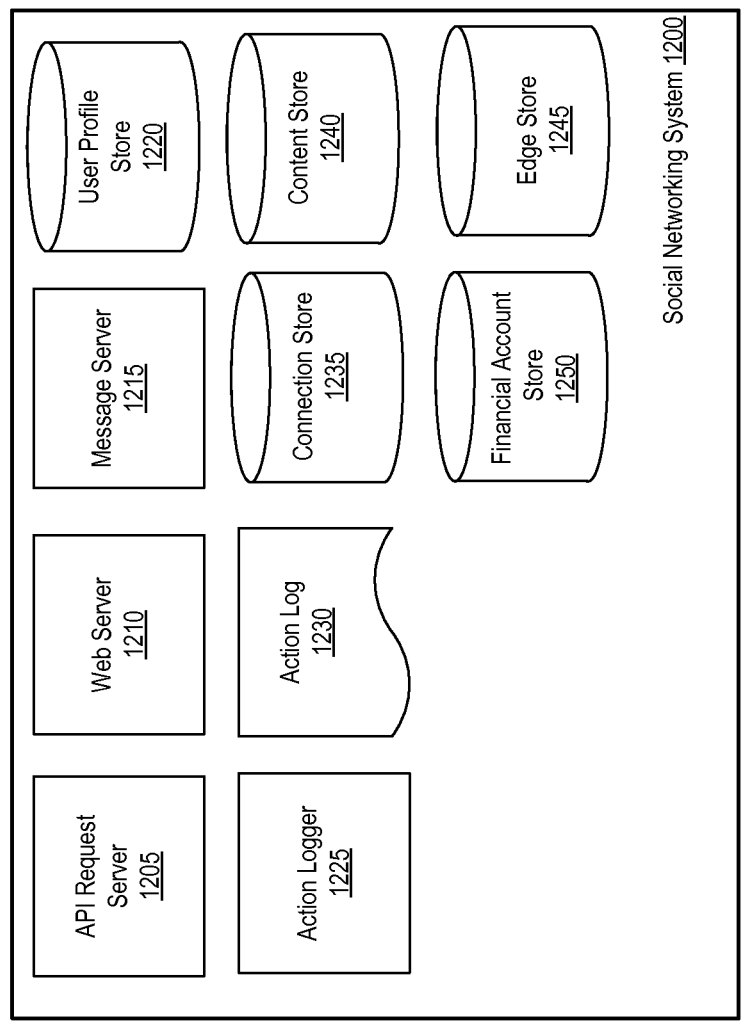
FIG. 12 is a block diagram of a system architecture of the social networking system with which some embodiments of the present invention may be utilized.

FIG. 12 is a block diagram of a system architecture of the social networking system 1200 with which some embodiments of the present invention may be utilized. Social networking system 1200 illustrated by FIG. 12 includes API request server 1205, web server 1210, message server 1215, user profile store 1220, action logger 1225, action log 1230, connection store 1235, content store 1240, edge store 1245, and financial account store 1250. Although not shown, some or all of the servers/stores etc. may comprise the storage management system discussed herein. In other embodiments, social networking system 1200 may include additional, fewer, or different modules for various applications. Conventional components such as network interfaces, security mechanisms, load balancers, failover servers, management and network operations consoles, and the like are not shown so as to not obscure the details of the system architecture.

API request server 1205 allows other systems, user devices, or tools to access information from social networking system 1200 by calling APIs. The information provided by the social network may include user profile information or the connection information of users as determined by their individual privacy settings. For example, a system, user device, or tools interested in accessing data connections within a social networking system may send an API request to social networking system 1200 via a network. The API request is received at social networking system 1200 by API request server 605.

Web server 1210 links social networking system 1200 via a network to one or more client devices; the web server serves web pages, as well as other web-related content, such as Java, Flash, XML, and so forth. The web server 1210 may communicate with the message server 1215 that provides the functionality of receiving and routing messages between social networking system 1200 and client devices. The messages processed by message server 1215 can be instant messages, queued messages (e.g., email), text and SMS (short message service) messages, or any other suitable messaging technique. In some embodiments, a message sent by a user to another can be viewed by other users of social networking system 1200, for example, by the connections of the user receiving the message. An example of a type of message that can be viewed by other users of the social networking system besides the recipient of the message is a wall post. In some embodiments, a user can send a private message to another user that can only be retrieved by the other user.

Each user of the social networking system 1200 is associated with a user profile, which is stored in user profile store 1220. A user profile includes declarative information about the user that was explicitly shared by the user, and may also include profile information inferred by social networking system 1200. In one embodiment, a user profile includes multiple data fields, each data field describing one or more attributes of the corresponding user of social networking system 1200. The user profile information stored in user profile store 1220 describes the users of social networking system 600, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of social networking system 1200 displayed in an image. A user profile in user profile store 1220 may also maintain references to actions by the corresponding user performed on content items in content store 1240 and stored in the edge store 1245.

A user profile may be associated with one or more financial accounts, allowing the user profile to include data retrieved from or derived from a financial account. A user may specify one or more privacy settings, which are stored in the user profile, that limit information from a financial account that social networking system 1200 is permitted to access. For example, a privacy setting limits social networking system 1200 to accessing the transaction history of the financial account and not the current account balance. As another example, a privacy setting limits social networking system 1200 to a subset of the transaction history of the financial account, allowing social networking system 1200 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by a social networking system 1200. In one embodiment, information from the financial account is stored in user profile store 1220. In other embodiments, it may be stored in financial account store 1250.

Action logger 1225 receives communications about user actions on and/or off social networking system 1200, populating action log 1230 with information about user actions. Such actions may include, for example, adding a connection to another user, sending a message to another user, uploading an image, reading a message from another user, viewing content associated with another user, attending an event posted by another user, among others. In some embodiments, action logger 1225 receives, subject to one or more privacy settings, transaction information from a financial account associated with a user and identifies user actions from the transaction information. For example, action logger 1225 retrieves vendor identifiers from the financial account's transaction history and identifies an object, such as a page, in social networking system 1200 associated with the vendor identifier. This allows action logger 1225 to identify a user's purchases of products or services that are associated with a page, or another object, in content store 1240. In addition, a number of actions described in connection with other objects are directed at particular users, so these actions are associated with those users as well. These actions are stored in action log 1230.

Action log 1230 may be used by social networking system 1200 to track user actions on social networking system 1200, as well as external website that communicate information to social networking system 1200. Users may interact with various objects on social networking system 1200, including commenting on posts, sharing links, and checking-in to physical locations via a mobile device, accessing content items in a sequence or other interactions. Information describing these actions is stored in action log 1230. Additional examples of interactions with objects on social networking system 1200 included in action log 1230 include commenting on a photo album, communications between users, becoming a fan of a musician, adding an event to a calendar, joining groups, becoming a fan of a brand page, creating an event, authorizing an application, using an application and engaging in a transaction. Additionally, action log 1230 records a user's interactions with advertisements on social networking system 1200 as well as other applications operating on social networking system 1200. In some embodiments, data from action log 1230 is used to infer interests or preferences of the user, augmenting the interests included in the user profile and allowing a more complete understanding of user preferences.

Action log 1230 may also store user actions taken on external websites and/or determined from a financial account associated with the user. For example, an e-commerce website that primarily sells sporting equipment at bargain prices may recognize a user of social networking system 1200 through social plug-ins that enable the e-commerce website to identify the user of social networking system 1200. Because users of social networking system 1200 are uniquely identifiable, e-commerce websites, such as this sporting equipment retailer, may use the information about these users as they visit their websites. Action log 1230 records data about these users, including webpage viewing histories, advertisements that were engaged, purchases made, and other patterns from shopping and buying. Actions identified by action logger 1225 from the transaction history of a financial account associated with the user allow action log 630 to record further information about additional types of user actions.

Content store 1240 stores content items associated with a user profile, such as images, videos or audio files. Content items from content store 1240 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of social networking system 1200. Examples of social networking content items include suggested connections or suggestions to perform other actions, media provided to, or maintained by, social networking system 1200 (e.g., pictures or videos), status messages or links posted by users to the social networking system, events, groups, pages (e.g., representing an organization or commercial entity), and any other content provided by, or accessible via, the social networking system.

Content store 1240 also includes one or more pages associated with entities having user profiles in user profile store 1220. An entity is a non-individual user of social networking system 1200, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in content store 1240, allowing social networking system users to more easily interact with the vendor via social networking system 1200. A vendor identifier is associated with a vendor's page, allowing social networking system 1200 to identify the vendor and/or to retrieve additional information about the vendor from user profile store 1220, action log 1230, or from any other suitable source using the vendor identifier. In some embodiments, the content store 1240 may also store one or more targeting criteria associated with stored objects and identifying one or more characteristics of a user to which the object is eligible to be presented.

In one embodiment, edge store 1245 stores the information describing connections between users and other objects on social networking system 1200 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in social networking system 1200, such as expressing interest in a page on the social networking system, sharing a link with other users of the social networking system, and commenting on posts made by other users of the social networking system. Edge store 1245 stores edge objects that include information about the edge, such as affinity scores for objects, interests, and other users. Affinity scores may be computed by social networking system 1200 over time to approximate a user's affinity for an object, interest, and other users in social networking system 1200 based on the actions performed by the user. Multiple interactions between a user and a specific object may be stored in one edge object in edge store 1245, in one embodiment. In some embodiments, connections between users may be stored in user profile store 1220, or user profile store 1220 may access edge store 1245 to determine connections between users.

V. Computer System Overview

Figure 13:
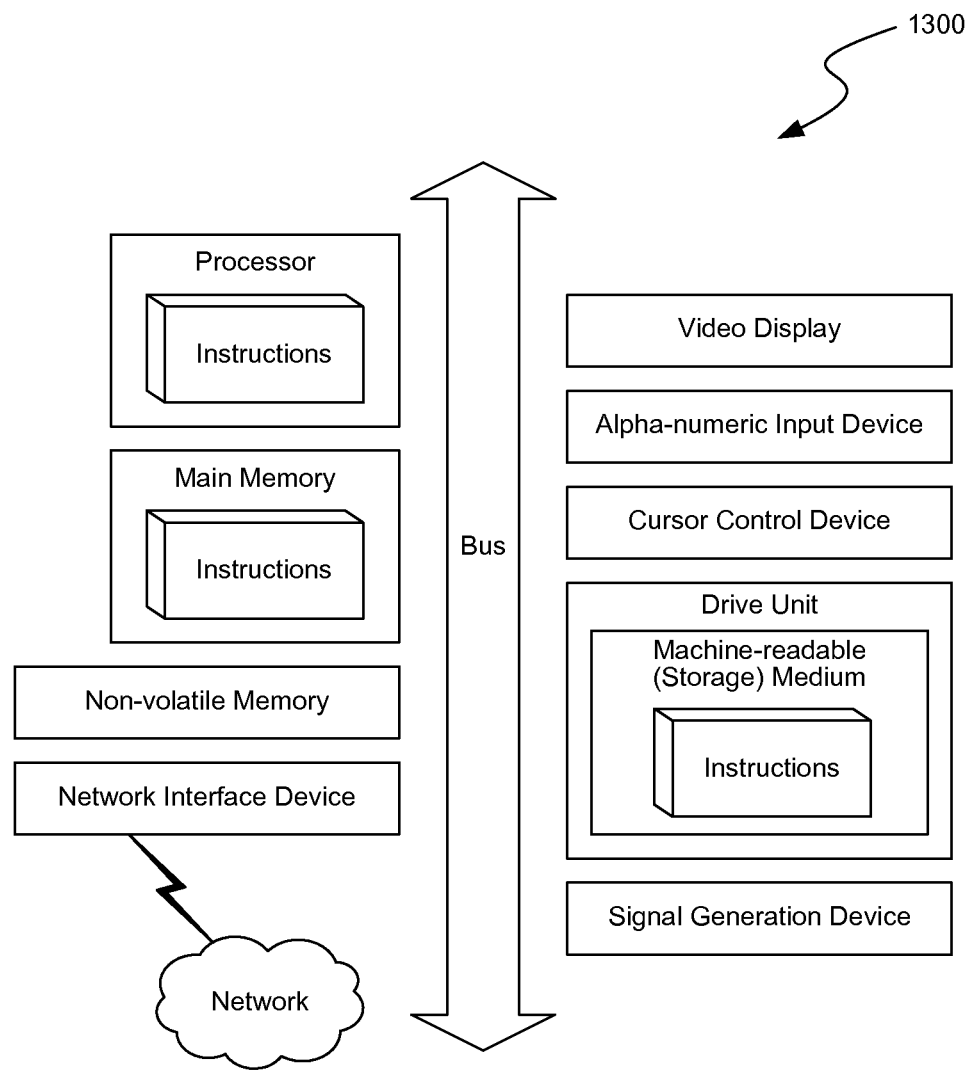
FIG. 13 shows a diagrammatic representation of a machine in the example form of a computer system.

FIG. 13 shows a diagrammatic representation of a machine in the example form of a computer system 1300, within which a set of instructions for causing the machine to perform any one or more of the methodologies discussed herein may be executed.

In alternative embodiments, the machine operates as a standalone device or may be connected (networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone or smart phone, a tablet computer, a personal computer, a web appliance, a point-of-sale device, a network router, switch or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (a centralized or distributed database, and/or associated caches and servers) that store the one or more sets of instructions. The term "machine-readable medium" or "machine readable storage medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include, but are not limited to, recordable type media such as volatile and non-volatile memory devices, floppy and other removable disks, hard disk drives, optical disks (e.g., Compact Disk Read-Only Memory (CD ROMs), Digital Versatile Discs, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the disclosure.

What is claimed is:

1. A method performed by a computing system, comprising:
    identifying, by the computing system, a non-indexed raw data set that is not indexed based on user identifiable information (UII) from computer memory in a data warehouse, wherein the raw data set meets an anonymization criteria and includes one or more instances of the UII;
    generating randomly generated information (RGI) to be associated with the UII, wherein the RGI is generated to be independent of the UII;
    associating, by the computing system, the UII with the RGI in an anonymization identification map;
    generating, by the computing system, an anonymized data set using the anonymization identification map, wherein the anonymized data set is an anonymized version of the raw data set, the generating the anonymized data set includes:
        determining that a portion of the non-indexed raw data set has a specified data structure,
        identifying a key in the non-indexed raw data set that is associated with a primary UII associated with the specified data structure, and
        replacing a value of the key with the RGI associated with the primary UII;
    receiving, by the computing system, an indication to delete an account associated with a user of a social networking system;
    identifying, by the computing system, a user identifier (UID) associated with the user, the UID being a specified UII of the user; and
    disassociating, by the computing system in the anonymization identification map, the specified UII from a specified RGI associated with the specified UII to delete the account associated with the user.

2. The method of claim 1, further comprising:
    storing, by the computing system, the anonymized data set in the data warehouse.

3. The method of claim 1, wherein generating the anonymized data set using the anonymization identification map comprises:
    replacing, by the computing system, at least one of the one or more instances of UII in the raw data set with an associated RGI.

4. The method of claim 1, wherein the UII comprises user identifiers (UIDs) and the RGI comprises randomly generated user identifiers (RIDs).

5. The method of claim 4, wherein each UID uniquely identifies a user of a social networking system.

6. The method of claim 1, wherein generating the anonymized data set using the anonymization identification map comprises:
   scanning, by the computing system, the raw data set to identify a complex structure;
   determining, by the computing system, a primary UII associated with the complex structure;
   parsing, by the computing system, the complex structure to identify a key associated with the UII;
   identifying, by the computing system, a value associated with the key; and
   replacing, by the computing system, the value with RGI associated with the primary UII.

7. The method of claim 6, further comprising:
   determining, by the computing system, that the key is another complex structure;
   parsing, by the computing system, the key to identify an additional key if a max depth threshold is not exceeded;
   identifying, by the computing system, an additional value associated with the additional key; and
   replacing, by the computing system, the additional value with RGI associated with the primary UII.

8. The method of claim 1, wherein generating the anonymized data set using the anonymization identification map comprises:
   identifying, by the computing system, a type of data in a column of the raw data set based on a metadata tag associated with the column;
   determining, by the computing system, an action associated with the metadata tag; and
   performing, by the computing system, the action to anonymize the data in the column.

9. The method of claim 8, wherein performing the action to anonymize the data in the column comprises replacing the one or more instances of UII in the column with an associated RGI.

10. The method of claim 8, wherein performing the action to anonymize the data in the column comprises executing a computer script to sanitize the data.

11. The method of claim 1, wherein the non-indexed raw data includes a plurality of tables and the raw data set meets the anonymization criteria if one or more of the plurality of tables meet or exceed a first age as determined from a date of origination in the data warehouse.

12. The method of claim 1, further comprising:
   removing, by the computing system, the raw data set at a second time subsequent to a first time, wherein the anonymized data set is generated at the first time.

13. The method of claim 1, further comprising
   maintaining, by the computing system, the anonymization identification map.

14. The method of claim 13, wherein maintaining the anonymization identification map comprises:
   accessing, by the computing system, a new data set upon occurrence of a triggering event;
   scanning, by the computing system, the new data set for instances of UII including a list of one or more scanned UIDs;
   accessing, by the computing system, a list of active UIDs, wherein an active UID is associated with a corresponding RID in the anonymization identification map;
   comparing, by the computing system, the list of scanned UIDs to the list of active UIDs to identify a list of new UIDs, wherein new UIDs are included in the list of scanned UIDs but not the list of active UIDs;
   generating, by the computing system, an RID for each of the new UIDs;
   associating, by the computing system, each generated RID with the corresponding new UID; and
   adding, by the computing system, the new UIDs to the list of active UIDs.

15. The method of claim 1, wherein generating the anonymized data set is initiated upon occurrence of a triggering event.

16. A system, comprising:
   a processor;
   a memory storing instructions, which when executed by the processor causes the processor to:
      access a non-indexed raw data set that is not indexed based on user identifiable information (UII) from a data warehouse and an anonymization identification map, wherein the non-indexed raw data set meets an anonymization criteria and includes one or more instances of UII and the anonymization identification map associates the UII with randomly generated information (RGI), wherein the RGI is generated to be independent of the UII;
      process the anonymization identification map and generate an anonymized data set using the anonymization identification map, wherein the anonymized data set is an anonymized version of the raw data set, wherein the anonymized data set is generated by:
         determining that a portion of the non-indexed raw data set has a specified data structure,
         identifying a key in the non-indexed raw data set that is associated with a primary UII associated with the specified data structure, and
         replacing a value of the key with the RGI associated with the primary UII;
      receive an indication to delete an account associated with a user of a social networking system;
      identify a user identifier (UID) associated with the user, the UID being a specified UII of the user; and
      disassociate, in the anonymization identification map, the specified UII from a specified RGI associated with the specified UII to delete the account associated with the user.

17. A non-transitory computer-readable storage medium storing computer-readable instructions, which when executed by a processor, causes the processor to perform a method comprising:
   identifying a non-indexed raw data set that is not indexed based on user identifiable information (UII) from computer memory in a data warehouse, wherein the raw data set meets an anonymization criteria and includes one or more instances of the UII;
   generating randomly generated information (RGI) to be associated with the UII, wherein the RGI is generated to be independent of the UII;
   associating the UII with the RGI in an anonymization identification map;
   generating an anonymized data set using the anonymization identification map, wherein the anonymized data set is an anonymized version of the raw data set, the generating the anonymized data set includes:
      determining that a portion of the non-indexed raw data set has a specified data structure,
      identifying a key in the non-indexed raw data set that is associated with a primary UII associated with the specified data structure, and
      replacing a value of the key with the RGI associated with the primary UII;
   receiving an indication to delete an account associated with a user of a social networking system;

identifying a user identifier (UID) associated with the user, the UID being a specified UII of the user; and disassociating, in the anonymization identification map, the specified UII from a specified RGI associated with the specified UII to delete the account associated with the user.

* * * * *